Sept. 3, 1968   C. E. BOARDMAN ET AL   3,400,048
STEAM COOLED NUCLEAR REACTOR POWER SYSTEM WITH STEAM
DECONTAMINATION TREATMENT
Filed Jan. 11, 1967   3 Sheets-Sheet 1

INVENTORS
Charles E. Boardman
Henry J. Schneider
Bernard F. Shoopak
Bertram Wolfe BY
Attorney INVENTORS
Charles E. Boardman
Henry J. Schneider
Bernard F. Shoopak
Bertram Wolfe INVENTORS
Charles E. Boardman
Henry J. Schneider
Bernard F. Shoopak
Bertram Wolfe United States Patent Office 3,400,048
Patented Sept. 3, 1968

3,400,048
STEAM COOLED NUCLEAR REACTOR POWER SYSTEM WITH STEAM DECONTAMINATION TREATMENT
Charles E. Boardman, San Jose, Henry J. Schneider, Sunol, Bernard F. Shoopak, Mountain View, and Bertram Wolfe, San Jose, Calif., assignors to General Electric Company, a corporation of New York
Filed Jan. 11, 1967, Ser. No. 608,547
12 Claims. (Cl. 176—60)

ABSTRACT OF THE DISCLOSURE

This invention relates to the conversion of mass to thermal energy in a steam cooled chain nuclear fission reactor utilized as a heat source in a nuclear power plant and in particular relates to such a power plant having an improved system for steam generation and purification. Superheated steam contaminants are removed from wet saturated steam. The saturated steam is introduced into the nuclear reactor where it is superheated.

---

The release of large amounts of energy through nuclear fission in chain nuclear fission reactors is now well known.

Useful mechanical or electrical energy can be generated by conversion of the heat energy liberated in such nuclear fisson reactions. This energy generation involves a chain reacting assembly containing nuclear fuel, a coolant passed through heat exchange relationship with the assembly, and control of the coolant flow and the assembly operating conditions to produce, either directly or indirectly, a heated coolant. This coolant is fed to a suitable prime mover, i.e., a device for converting heat energy to either mechanical or electrical energy or both, to generate mechanical or electrical energy. Reasonably high thermodynamic energy conversion efficiencies are favored by the delivery of the heated coolant from the chain reacting assembly to the prime mover inlet at as high a temperature as possible. In the usual industrial application, using a heat sink temperature of about 100° F. for example, the lowest feasible coolant inlet temperatures at the prime mover inlet are in most cases in the range of 200° to 300° F., but the conversion efficiencies are quite low. Steam has been the principal working fluid in such prime movers, and since thermodynamic efficiencies increase with an increase in the inlet temperature of the working fluid, steam superheating has long been practiced in power plant systems deriving their heat from fossil fuel combustion. In addition to increased efficiency, superheating provides a reduction of condensation within the prime mover and consequently a decrease in erosion problems. Prime mover construction is also considerably simplified, and in addition a smaller heat sink (turbine-condenser) is required.

The superheating of steam in a nuclear reactor presents distinct problems from those involved in the superheating of steam by fossil fuel combustion. The major problem involves the possible migration of radioactive materials which either leak from defective fuel or are released by erosion or corrosion from structural surfaces in the reactor core in contact with the steam coolant. Such materials are carried into and deposited in the steam turbine (or other heat sink) and its associated piping. Such an occurrence requires additional shielding and presents extremely difficult and expensive equipment decontamination problems. One way of avoiding this problem is to resort to an indirect cycle system in which one fluid is used as reactor coolant with a second coolant being used as the turbine working fluid, the two fluids being brought into indirect heat exchange with one another.

Another problem involves the use of such contaminated superheated steam to evaporate condensate-feedwater to produce the saturated steam introduced as coolant to the reactor. The usual direct contact evaporator, such as the known Loeffler boiler, is not by itself capable of producing satisfactory decontaminated saturated steam coolant.

It is an object of this invention to provide an improved power plant system using a steam cooled nuclear reactor as the heat source and in which radioactive contamination of the heat sink and its associated piping and other equipment is avoided through the use of a particularly improved method and apparatus for generating purified saturated steam without the disadvantages of using two coolant fluids in an indirect cycle.

The present invention will be readily understood by reference to the accompanying drawings and their associated detailed decription in which.

Figure 1:
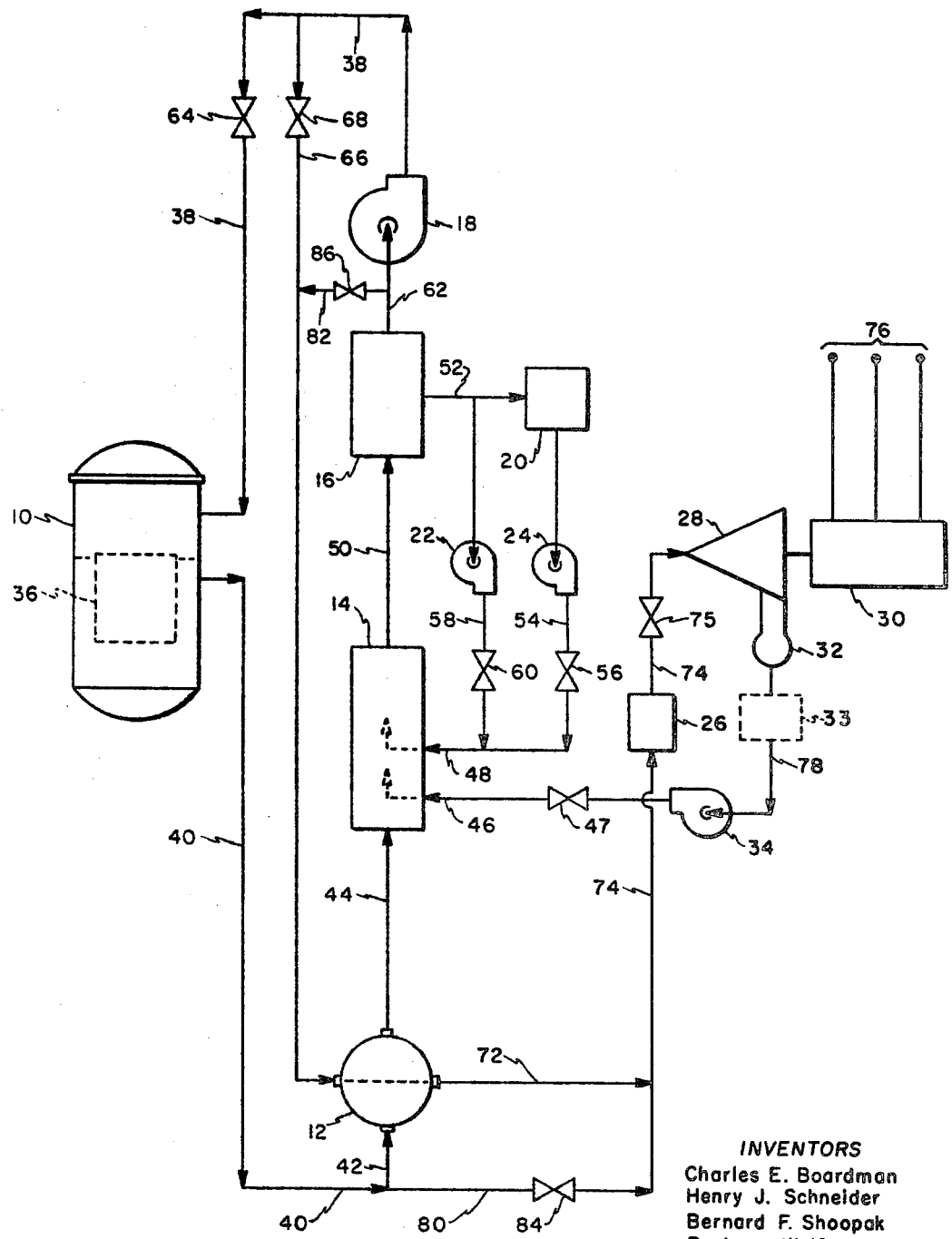
FIGURE 1 is a simplified schematic flow diagram of the power plant system of this invention.

Referring now to FIGURE 1, the essential parts of the power plant system utilizing this invention include reactor vessel 10, heat exchanger 12, steam desuperheater 14, steam dryer 16, steam recirculator 18, water purification means 20, recirculation pump 24, steam filter 26, turbine 28, generator 30, condenser 32, and condensate feedwater pump 34, and associated valves and piping.

Reactor vessel 10 contains a steam cooled nuclear chain fission reacting core 36, which may be a fast neutron spectrum reactor described in further detail in a copending application Ser. No. 608,548 filed of even date herewith by Bertram Wolfe and entitled "Steam Cooled Nuclear Reactor Power System." Saturated steam is introduced by means of line 38 and after passing through heat exchange relation with the fuel elements of reactor core 36 is discharged through line 40 in a highly superheated condition. Typical steam temperature for system operation at 1500 p.s.i. are approximately 600° F. at inlet line 38 and 950° F. at outlet line 40. This steam is possibly contaminated with radioactive materials referred to above.

Superheated steam from line 40 is passed by means of line 42 through the shell side of heat exchanger 12, where the steam is cooled somewhat, and on through line 44 into steam desuperheater 14. The desuperheater is provided with water inlets 46 and 48 by means of which condensate-feedwater and recirculated purified water is brought into direct contact with the superheated steam. This contact completely desuperheats the steam, evaporates an amount of water ranging from 25–35% by weight of the amount of superheated steam introduced, and produces wet saturated steam containing entrained water.

This wet saturated steam is discharged from desuperheater 14 through line 50 into steam dryer 16. Here the entrained moisture is separated and the steam dried. The separated moisture is accumulated and passed through line 52 into water purification zone 20 where undesirable contaminants, including radioactive materials, are removed by filtration, ion exchange, or other purification treatments suitable to the particular contaminant present. The thus purified water is recirculated by means of pump 24, line 54, and valve 56 to steam desuperheater 14 for reevaporization. Depending upon the degree of contamination present, the separated water from separator-dryer 16 may be directly recirculated without purification by means of pump 22, line 58, and valve 60.

The saturated steam is withdrawn from separator-dryer 16 through line 62 and is divided into two portions. The major portion, approximately 75% of the total, is returned by means of steam circulator 18 through line 38 and valve 64 as inlet saturated steam coolant to reactor vessel 10. The remaining minor portion, approximately 25%, is passed through line 82 and valve 86 through the tube side of heat exchanger 12 in countercurrent heat exchange relation with the superheated steam effluent from the reactor flowing on the shell side. Here the minor steam portion is superheated substantially, closely approaching a temperature equal to that of the reactor coolant outlet. This is largely due to the fact that the flow ratio of reactor effluent steam on the shell side to the minor portion steam on the tube side is approximately 4:1.

Superheated steam produced in the tube side of exchanger 12 flows through lines 72 and 74, including an optional steam filter 26, and into turbine 28 driving generator 30 provided with output terminals 76. Exhaust steam condenses in condenser 32 and the condensate is circulated by means of condensate-feedwater pump 34 and lines 78 and 46 and valve 47 through an optional condensate purification zone 33 and into desuperheater 14.

In the system described above, both bypass lines 80 and 66, provided respectively with valve 84 and 68, are closed. The entire quantity of superheated steam driving turbine 28 may be produced in desuperheater 14 and superheated in exchanger 12; it need not flow directly from reactor vessel 10 to the turbine. Any radioactive contaminants released in reactor core 36 are carried through exchanger 12 into desuperheater 14 in which, because the steam is desuperheated by direct contact with a controlled excess of recirculated feedwater and condensate, are substantially completely retained in the water phase. The saturated steam produced, after separation of the contaminated entrained moisture, is found to have a radioactivity level which is approximately $1 \times 10^{-3}$ to $1 \times 10^{-4}$ the level which may exist in the reactor effluent. Thus, the superheated steam driving turbine 28 is free of radioactive contaminants and yet has a temperature very close to that of the reactor effluent. The accumulation and removal of these contaminants is accomplished by careful control of the operating conditions maintained in desuperheater 14 and in separator-dryer 16, in conjunction with application of water purification techniques in zone 20.

In FIGURE 1, desuperheater 14, separator-dryer 16, water purification zone 20, and the associated recirculation system in operation cooperate together to permit a highly efficient production of decontaminated dry saturated steam from contaminated superheated steam introduced through line 44, and at least partially purified recirculation water introduced through lines 46 and 48. The essential steps involved are (1) the introduction into desuperheater zone 14 of water in dispersed form (such as a spray) and at a rate in controlled excess of that required to desuperheat completely the contaminated superheated steam simultaneously introduced thus producing wet saturated steam, (2) the separation of entrained moisture from the wet saturated steam in separtor-dryer zone 16 producing dry decontaminated saturated steam and contaminated water, and (3) treatment of the contaminated water to remove contaminants prior to recirculation of such water, together with recirculated condensate-feedwater, into desuperheater zone 14.

By dispersing the water introduced into desuperheater zone 14 and controlling the relative steam and water flow rates, a great improvement in the degree of steam decontamination (over that realized in dispersing the steam in a body of water) is found to result. Contaminated superheated steam flows through desuperheater zone 14 at high velocity past the spray nozzles (or other dispersion devices) connected at the ends of water inlet lines 46 and 48. Turbulent flow conditions are maintained and the dispersed water droplets and superheated steam are brought into intimate contact, providing a very high ratio of water droplet surface area to water volume. This results in highly efficient heat transfer to desuperheat the steam and evaporates a substantial part but not all of the water droplets. It also provides in the resulting wet saturated steam entrained water droplets of high contact surface area serving as nuclei for accumulation of suspended contaminants and providing a washing effect on the steam. This mixture discharges through line 50 into separator-dryer zone 16 where the excess entrained water, containing the contaminants, is separted for purification in purification zone 20 and recirculation.

Water treatment effected in purification zone 20 may comprise either water filtration, ion exchange, or both, or other procedures to remove contaminants present. It has been found that beds of finely divided mixed anion-cation exchange resins provide extremely effective removal of both suspended particulate and dissolved ionic contaminants. The purified water is pumped back into desuperheater 14 through lines 54 and 48 at a rate controlled by valve 56.

The extent of decontamination effected is a complex function of (1) the amount of water recirculated to desuperheater zone 14 in excess of that required to desuperheat the inlet superheated steam, (2) the amount of entrained moisture remaining in the saturated steam discharged from separator-dryer 16, and (3) the flow rate of decontaminated water recirculated from purification zone 20 to desuperheater zone 14. Since the rate of recirculation of decontaminated water from purification zone 20 may be widely varied, and since the relative flows of superheated steam and recirculated condensate-feedwater in desuperheater zone 14 are subject to some variation, this method of superheated steam decontamination and saturated steam generation provides great flexiblity to meet wide variations in reactor system conditions.

In one modification of this invention, the power plant system illustrated in FIGURE 1 may be operated with valve 86 closed and valve 68 in bypass line 68 open, valve 84 in bypass line 80 also being closed. This results in a significant increase in the pressure of superheated steam introduced from exchanger 12 through lines 72 and 74 into turbine 28, but of course increases by approximately 25–35% the horsepower requirement to drive steam circulator 18. This is due to the fact that the power requirement for circulator 18 is applied to the flow of steam directed as reactor core 36 coolant passing through line 38 and valve 64, as well as to the saturated steam introduced to exchanger 12. The superheated steam supplied to the turbine 28 is at a pressure substantially equal to that of the saturated steam inlet to reactor core 36, less steam line pressure drops. In this modified operation, as in the operation described above, any radioactive contaminant carryover from reactor core 36 is substantially completely accumulated in the entrained water phase formed and maintained in desuperheater 14 and recovered in separator-dryer 16, and is thus prevented from reaching turbine 28.

In another modification of this invention, a modification which is particularly applicable during operation with new fuel loaded in reactor core 36, or with substantially all of any defective fuel previously present in the core having been removed and replaced with sound reload fuel, the system of FIGURE 1 may be operated with valve 68 in bypass line 66 and valve 86 in line 82 both closed, and valve 84 in bypass line 80 open. In such operation, no superheated steam is produced in exchanger 12 and superheated steam is passed directly from reactor vessel 10 through lines 40, 80, and 74 to turbine 28. Such operation of the system is somewhat similar to the previously known Loeffler boiler, except that the desuperheater 14 and separator-dryer 16 operation provide a highly advantageous cleaning and decontamination of the saturated steam coolant introduced to reactor core 36. The system of this invention may be operated in that manner so long as the fuel in reactor core 36 is free of defects extensive enough to cause an unacceptable radioactive contamination of the steam, with the attendant advantages of maximum steam temperature at the turbine 28 inlet and maximum thermodynamic efficiencies. As soon as unacceptable levels of radioactive contamination are detected in steam outlet line 40, valve 84 in bypass line 80 may be partially or completely closed (depending on the degree of contamination) and valve 86 in line 82 may be opened partially or completely to produce uncontaminated superheated steam in exchanger 12 and reduce the degree of contamination in the steam mixture delivered to the turbine.

In a third modification of this invention, the procedure just described may be changed to open valve 68 in bypass line 66 rather than valve 86 in line 82. This results in the increases in turbine inlet pressure and circulator power requirements referred to in the description of the first modification.

Following in tubular form is a specific example of the operation of the system of this invention as applied in the manner described in connection with FIGURE 1.

EXAMPLE I

Reactor core 36

| | | |
|---|---|---|
| Power level | mwt | 139.0 |
| Coolant flow ($\times 10^{-6}$) | lb./hr | 1.735 |
| Inlet temperature | °F | 608.5 |
| Outlet temperature | °F | 950 |
| Inlet pressure | p.s.i.a | 1500 |
| Outlet pressure | p.s.i.a | 1400 |

Heat exchanger 12

| | | |
|---|---|---|
| Heat load ($\times 10^{-6}$) | B.t.u./hr | 139.0 |
| Tube side: | | |
| Flow ($\times 10^{-6}$) | lb./hr | 1.735 |
| Outlet temperature | °F | 817 |
| Outlet pressure | p.s.i.a | 1340 |
| Shell side: | | |
| Flow ($\times 10^{-6}$) | lb./hr | 0.536 |
| Outlet temperature | °F | 900 |
| Outlet pressure | p.s.i.a | 1200 |

Steam generator 14

| | | |
|---|---|---|
| Heat load ($\times 10^{-6}$) | B.t.u./hr | 366.0 |
| Inlet flow: | | |
| Superheated steam: | | |
| Flow rate ($\times 10^{-6}$) | lb./hr | 1.735 |
| Inlet temperature | °F | 818 |
| Inlet pressure | p.s.i.a | 1340 |
| Feedwater: | | |
| Flow rate ($\times 10^{-6}$) | lb./hr | 0.536 |
| Inlet temperature | °F | 520 |
| Inlet pressure | p.s.i.a | 1400 |
| Water purification 20: | | |
| Water purification flow ($\times 10^{-6}$) | lb./hr | 252 |
| Inlet temperature | °F | 561 |
| Inlet pressure | p.s.i.a | 1340 |
| Bypassed (line 58) flow | lb./hr | 0 |
| Outlet flow: | | |
| Flow rate ($\times 10^{-6}$) | lb./hr | 2.523 |
| Quality | percent | 90 |
| Temperature | °F | 577 |
| Pressure | p.s.i.a | 1310 |

Steam separator-dryer 16

| | | |
|---|---|---|
| Inlet flow: | | |
| Flow rate ($\times 10^{-6}$) | lb./hr | 2.523 |
| Quality | percent | 90 |
| Temperature | °F | 577 |
| Pressure | p.s.i.a | 1310 |
| Outlet flow: | | |
| Saturated steam: | | |
| Flow rate ($\times 10^{-6}$) | lb./hr | 2.271 |
| Temperature | °F | 577 |
| Pressure | p.s.i.a | 1300 |
| Quality | percent | 99.99 |
| Separated water: | | |
| Flow rate ($\times 10^{-6}$) | lb./hr | 0.252 |
| Temperature | °F | 577 |
| Pressure | p.s.i.a | 1300 |
| Steam decontamination factors:[1] | | |
| Washing system operating (flows as above) | | 1000 |
| Washing system not operating (zero flow through line 48, 100% quality line 50) | | 1 |

Circulator 18

| | | |
|---|---|---|
| Flow rate ($\times 10^{-6}$) | lb./hr | 1.735 |
| Head | p.s.i.a | 210 |
| Inlet: | | |
| Pressure | p.s.i.a | 1300 |
| Temperature | °F | 580 |
| Outlet: | | |
| Pressure | p.s.i.a | 1510 |
| Temperature | °F | 608 |

Turbine 28

| | | |
|---|---|---|
| Flow rate ($\times 10^{-6}$) | lb./hr | 0.536 |
| Inlet temperature | °F | 900 |
| Inlet pressure | p.s.i.a | 1170 |

Generator 30

| | | |
|---|---|---|
| Output, gross | mwe | 56 |

Condenser 32

| | | |
|---|---|---|
| Heat load ($\times 10^{-6}$) | B.t.u./hr | 273 |
| Cooling water flow ($\times 10^{-6}$) | lb./hr | 0.3 |

[1] Ratio of the amount of contaminants in the steam entering the desuperheater (line 44) to the amount in the steam leaving the dryer (line 62).

Figure 2:
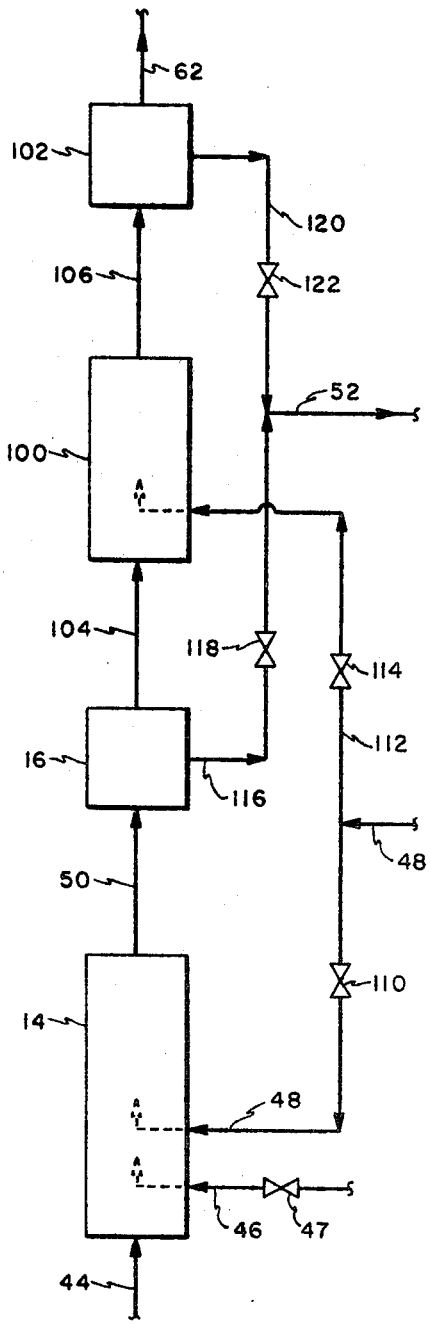
FIGURE 2 is a partial schematic flow diagram of a modified form of the improved steam generation and decontamination system of this invention.

Referring now to FIGURE 2, a modification of the steam desuperheating and decontamination system of FIGURE 1 is shown, and in which multiple water injection and water separator-dryer zones are utilized. In FIGURE 2, desuperheater zone 14 and (first) separator-dryer zone 16 correspond to those illustrated in FIGURE 1, and communicate through lines 52 and 48 with a water purification zone not shown but corresponding to zone 20 in FIGURE 1. In FIGURE 2, second steam-water contact zone 100 and second separator-dryer zone 102 are added, so that the steam flow is from superheated steam inlet line 44 successively through desuperheater zone 14, line 50, first separator-dryer zone 16, line 104, second steam-water contact zone 100, line 106, second separator-dryer zone 102, and saturated steam outlet line 62. If desired, a greater number of serially connected alternate steam-water contact zones and separator-dryer zones may be added, but for purposes of illustration only one such added zone is described here.

Condensate-feedwater is introduced as before through line 46 and valve 47 into desuperheater zone 14. Recirculated water flowing in line 48, is divided into two streams, one flowing through line 48 and valve 110 into desuperheater zone 14 and the other through line 112 and valve 114 into steamwater contact zone 100. Moisture entrained in the steam entering separator-dryer zones 16 and 102, is separated and is removed respectively through lines 116 and valve 118, and line 120 and valve 122, for recirculation through line 52. In this manner, the superheated steam may be desuperheated and decontaminated, condensate-feedwater may be evaporated to produce saturated steam, and the saturated steam may be subjected to a number of alternate "washing" and drying treatments to produce substantially dry and fully decontaminated steam.

Figure 4:
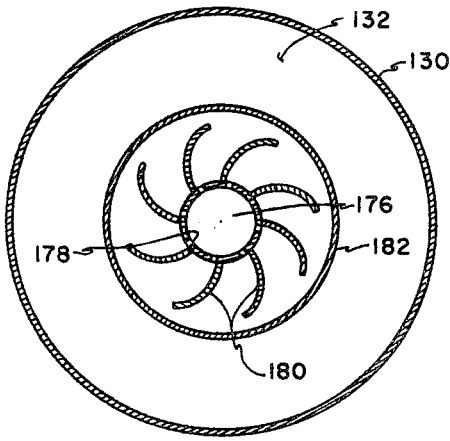
FIGURES 3 and 4 show views in cross-section of equipment for generating and decontaminating steam in accordance with this invention.
Figure 3:
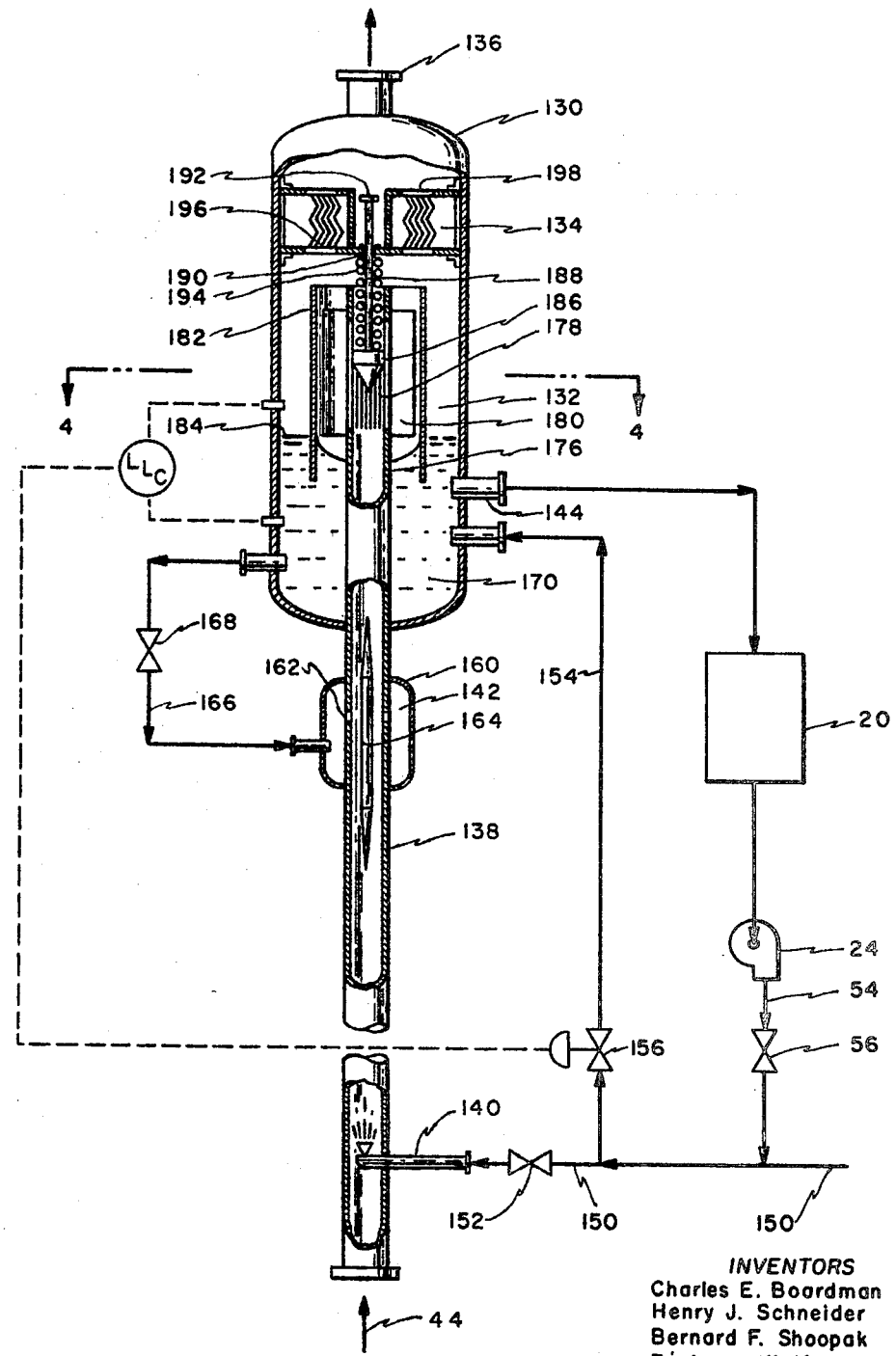

Referring now to FIGURES 3 and 4, an elevation view and a horizontal cross-section view, respectively, in cross-section of a modified form of steam desuperheating and drying equipment according to this invention are shown, together (in the case of FIGURE 3) with a schematic illustration of the water purification and recirculation system described in connection with FIGURES 1 and 2. The principal equipment items include separator-dryer vessel 130 provided with a radial vane-type steam-water separator 132, a steam dryer 134, steam outlet 136, steam inlet and desuperheating line 138, water inlet 140, aspiration zone 142, and water outlet 144.

In this modification, contaminated superheated steam, flowing through line 44 shown in FIGURES 1 and 2, is passed upwardly and mixed with subcooled condensate-feedwater introduced through line 150, together with decontaminated recirculation water from zone 20, and through valve 152 into inlet 140. Part of this water stream may also be introduced through line 154 and valve 156 directly into vessel 130 in order to subcool water body 170 and maintain level 184. In this way water lost due to evaporation in vessel 130 may be replaced, and cavitation in aspiration line 166 referred to below is prevented. The partially desuperheated steam flows on through aspiration zone 142 formed by chamber 160 enclosing a section of desuperheating line 138 provided with openings 162 and flow area reducer 164. Line 166 and valve 168 permit a controllable aspiration flow of water from the body 170 of separated water in vessel 130. This aspiraiton step overcomes many difficulties otherwise associated with pumping substantially saturated water from body 170. The resulting flow of water is drawn into aspiration zone 142 and on through openings 162 into admixture with the mixture flowing in desuperheater 138. This completes the steam desuperheating and produces a mixture of saturated steam containing entrained moisture, with contaminants primarily contained in the liquid moisture phase. The major desuperheating effect is accomplished by introducing at inlet 140 a mixture of condensate-feedwater flowing through line 150 and decontaminated recirculation water flowing from zone 20 through line 54. In this way, and due to the subcooling effect of water introduced into body 170 through line 154, the vaporization of contaminated recirculation water in aspiration zone 142 is minimized.

The fully desuperheated steam-water mixture flows upwardly into radial vane separator 132 which includes central inlet tube 176 provided with longitudinal radially-spaced slots or nozzles 178, a plurality of curved radial vanes 180 secured to and arranged around tube 176, and outer baffle 182 which is open ended and extends from a level above the upper ends of vanes 180 to a position below the lower end of the vanes and below level 184 of water body 170. Located within central inlet tube 176 is a movable plug 186 provided with shaft 188, seal 190, stop 192, and biasing spring 194, biasing stop 192 downwardly against seal 190 at which point plug 186 is below the lower ends of nozzles 178 closing the exit end of central inlet tube 176. (If desired, a weight not shown, may be attached to the plug 186-shaft 188 combination as a replacement for spring 194.)

The wet-saturated steam mixture discharges from central tube 176 radially outward through the open portion of nozzles 178 below plug 186, across the inner curving surfaces of radial vanes 180 causing separation of entrained water and establishing a water vortex on the inner surface of baffle 182. Separated water flows downward, collecting as body 170, and separated steam passes upward entering dryer 134 through openings 196 and discharging substantially free of entrained moisture and contamination through openings 198 and outlet 136. As the steam-water mixture enters central inlet tube 176 at higher or lower flow rates, plug 186 moves correspondingly upward or downward in response to higher or lower pressures providing a variable length and open flow area of nozzles 178. In this manner approximately constant flow velocities through the nozzles and across the vanes are maintained over an extremely wide range of flow rates at high separation efficiencies.

Although the foregoing description including examples have dealt with a power reactor system having an electrical rating of about 50 mw. and a fast neutron spectrum steam cooled reactor having a thermal power rating of about 140 mw., the invention is, of course, not so limited, and higher as well as lower energy ratings are contemplated. Furthermore, although several particular embodiments of the steam generation and decontamination system of this invention have been described above in considerable detail by way of illustration, it should be understood that various other modifications and adaptations may be made by those skilled in this particular art without departing from the spirit and scope of this invention as defined in the following claims:

We claim:

1. In a nuclear reactor power apparatus which comprises a nuclear chain fission reactor heat source, a saturated steam generator, means for circulating steam from said steam generator successively through said heat source to form superheated steam and at least in part back to said steam generator, a steam driven prime mover connected to a load and an exhaust steam condenser, means for passing steam superheated by absorption of thermal energy released in said heat source to said prime mover, and means for returning condensate from said condenser to said steam generator, the improvement in which said steam generator comprises a direct contact desuperheater connected in flow delivery relation to a steam-water separator, a water decontamination means connected in water receiving relation to said separator and in water delivery relation to said desuperheater, and means for maintaining the ratio of the flow of water to the flow of superheated steam introduced into said desuperheater at a value in excess of that required to desuperheat the superheated steam completely whereby superheated steam contaminants are accumulated in the excess water entrained in the wet saturated steam produced and are separated from said saturated steam in water discharged from said separator to said decontamination means.

2. An apparatus according to claim 1 wherein said heat source is connected to deliver a major proportion of said superheated steam to said steam generator and a minor proportion to said steam driven prime mover.

3. An apparatus according to claim 1 in combination with an indirect heat exchanger having two flow paths, one flow path of which is connected in steam receiving relation to said heat source and in steam delivery relation to said steam generator, and the other flow path of which is connected in steam receiving relation to said steam generator and in steam delivery relation to said prime mover.

4. An apparatus according to claim 1 wherein said desuperheater is connected to receive condensate from said exhaust steam condenser at a point upstream, relative to the superheated steam flow direction therein, from the point at which said desuperheater is connected to receive water recirculated from said separator.

5. In a nuclear reactor power apparatus which comprises a nuclear chain fission reactor heat source, a saturated steam generator, means for circulating steam from said steam generator successively through said heat source to form superheated steam and at least in part back to said steam generator, a steam driven prime mover connected to a load and an exhaust steam condenser, means for passing steam superheated by absorption of thermal energy released in said heat source to said prime mover, and means for returning condensate from said condenser to said steam generator, the improvement in which said steam generator comprises a direct contact desuperheater connected in flow delivery relation to a steam-water separator, a water decontamination means connected in water receiving relation to said separator and in water delivery relation to said desuperheater, and means for maintaining the ratio of the flow of water to the flow of superheated steam introduced into said desuperheater at a value in excess of that required to desuperheat the superheated steam completely whereby superheated steam contaminants are accumulated in the excess water entrained in the wet saturated steam produced and are separated from said saturated steam in water discharged from said separator to said decontamination means; together with at least one steam-water contactor each connected in steam delivery relation to a second steam-water separator and in water receiving relation to said decontamination means, said contactor and said separator combination being connected in saturated steam receiving relation to the first-named steam-water separator and in dry saturated steam delivery relation to said heat source.

6. In a nuclear reactor power apparatus which comprises a nuclear chain fission reactor heat source, a saturated steam generator, means for circulating steam from said steam generator successively through said heat source to form superheated steam and at least in part back to said steam generator, a steam driven prime mover connected to a load and an exhaust steam condenser, means for passing steam superheated by absorption of thermal energy released in said heat source to said prime mover, and means for returning condensate from said condenser to said steam generator, the improvement in which said steam generator comprises a direct contact desuperheater connected in flow delivery relation to a steam-water separator, a water decontamination means connected in water receiving relation to said separator and in water delivery relation to said desuperheater, and means for maintaining the ratio of the flow of water to the flow of superheated steam introduced into said desuperheater at a value in excess of that required to desuperheat the superheated steam completely whereby superheated steam contaminants are accumulated in the excess water entrained in the wet saturated steam produced and are separated from said saturated steam in water discharged from said separator to said decontamination means; together with water aspiration means connected in steam transmitting relation between said desuperheater and said separator and in water receiving relation to said separator, and means for introducing water delivered from said water decontamination means into said separator.

7. An apparatus according to claim 6 in combination with means for combining said condensate with water delivered from said water decontamination means prior to delivery to said desuperheater and said separator.

8. In a nuclear reactor power apparatus which comprises a nuclear chain fission reactor heat source, a saturated steam generator, means for circulating steam from said steam generator successively through said heat source to form superheated steam and at least in part back to said steam generator, a steam driven prime mover connected to a load and an exhaust steam condenser, means for passing steam superheated by absorption of thermal energy released in said heat source to said prime mover, and means for returning condensate from said condenser to said steam generator, the improvement in which said steam generator comprises a direct contact desuperheater connected in flow delivery relation to a steam-water separator, a water decontamination means connected in water receiving relation to said separator and in water delivery relation to said desuperheater, and means for maintaining the ratio of the flow of water to the flow of superheated steam introduced into said desuperheater at a value in excess of that required to desuperheat the superheated steam completely whereby superheated steam contaminants are accumulated in the excess water entrained in the wet saturated steam produced and are separated from said saturated steam in water discharged from said separator to said decontamination means; said separator comprising a radial vane separator provided with a biased movable pressure responsive plug means adapted to vary the open flow area through which the steam-water mixture discharges against the vanes of said separator to maintain the flow velocity of said mixture at a substantially constant value across said vanes.

9. In a process for production of useful energy from a nuclear chain fission reaction which comprises establishing a nuclear chain fission reaction to release thermal energy, utilizing steam superheated by absorption of said thermal energy to produce said useful energy and steam condensate, directly mixing at least part of said superheated steam with said condensate to evaporate said condensate and produce dry saturated steam, and utilizing at least part of said saturated steam to absorb thermal energy from said reaction, the improvement which comprises mixing at least part of said superheated steam and said condensate in a desuperheating zone under conditions controlled to desuperheat said superheated steam completely and produce wet saturated steam, separating entrained water from said wet saturated steam in a steam-water separation zone to produce said dry saturated steam, removing contaminants from at least part of the water recovered in said separation zone, and introducing said water into said desuperheating zone.

10. A process according to claim 9 in combination with the step of controlling the ratio of the flow of said water to the flow of said superheated steam introduced into said desuperheating zone at a value in excess of that required to desuperheat completely said superheated steam introduced into said desuperheating zone.

11. A process according to claim 9 in combination with the steps of subjecting the saturated steam removed from said steam-water separation zone to at least one additional sequence of treatments in which first additional water is dispersed into said steam and second the dispersed water is separated from the mixture leaving dry saturated steam.

12. A process according to claim 9 in which the step of removal of contaminants from water removed from said steam-water separation zone is effected by contacting said water with an ion exchange resin.

References Cited
UNITED STATES PATENTS

| | | | |
|---|---|---|---|
| 3,085,964 | 4/1963 | Ritz et al. | 176—60 |
| 3,108,938 | 10/1963 | Nettel et al. | 176—60 |
| 3,117,422 | 1/1964 | Bauer et al. | |
| 3,161,572 | 12/1964 | Kagi | 176—60 X |
| 3,247,650 | 4/1966 | Kornbichler | 176—54 X |

REUBEN EPSTEIN, *Primary Examiner.*